United States Patent
Abdolvand et al.

(10) Patent No.: US 11,162,972 B2
(45) Date of Patent: Nov. 2, 2021

(54) RESONANT MEMS PIEZOELECTRIC SENSOR

(71) Applicant: University of Central Florida Research Foundation, Inc., Orlando, FL (US)

(72) Inventors: Reza Abdolvand, Winter Park, FL (US); Hakhamanesh Mansoorzare, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 187 days.

(21) Appl. No.: 16/421,082

(22) Filed: May 23, 2019

(65) Prior Publication Data

US 2019/0361045 A1   Nov. 28, 2019

Related U.S. Application Data

(60) Provisional application No. 62/675,249, filed on May 23, 2018.

(51) Int. Cl.
*G01P 15/125* (2006.01)
*G01P 15/08* (2006.01)
*G01L 9/00* (2006.01)

(52) U.S. Cl.
CPC ........ *G01P 15/0802* (2013.01); *G01L 9/0072* (2013.01); *G01P 15/125* (2013.01)

(58) Field of Classification Search
CPC .. G01P 15/0802; G01P 15/125; G01L 9/0072; G01L 9/0075

(Continued)

(56) References Cited

U.S. PATENT DOCUMENTS

| | | | | |
|---|---|---|---|---|
| 4,100,512 A | * | 7/1978 | Valdois | H03B 5/32 331/158 |
| 6,067,363 A | * | 5/2000 | Dent | H04R 3/00 381/113 |

(Continued)

OTHER PUBLICATIONS

Wenli Zhou, Wei-Hsin Liao and Wen J. Li, Department of Automation and Computer-Aided Engineering, The Chinese University of Hong Kong, Shatin, N.T., Hong Kong—"Analysis and design of a self-powered piezoelectric microaccelerometer", Event: SPIE Smart Structures and Materials + Nondestructive Evaluation and Health monitoring, 2005, San Diego, CA, US—pp. 233-240.

(Continued)

*Primary Examiner* — Robert R Raevis
(74) *Attorney, Agent, or Firm* — Fleit Intellectual Property Law; Thomas S. Grzesik

(57) ABSTRACT

A microelectromechanical system (MEMS) sensor includes a substrate having a piezoelectric layer thereon; a MEMS piezoelectric resonator including a reference electrode on a first side of the piezoelectric layer, a first port (port 1) including a capacitor coupling electrode on a side of the piezoelectric layer opposite the first side, and a second port (port 2) for excitation signal coupling including another electrode on the side opposite the first side. The MEMS piezoelectric resonator has a natural resonant frequency. A variable capacitor on the substrate is positioned lateral to the MEMS piezoelectric resonator having a first and a second plate are connected to port 1. An antenna or an oscillator circuit is connected to port 2. Responsive to a physical parameter a capacitance of the variable capacitor changes which changes a frequency of the MEMS piezoelectric resonator relative to the natural resonant frequency to generate a frequency shift.

18 Claims, 14 Drawing Sheets

(58) Field of Classification Search
USPC ...... 361/280, 282–286; 73/514.32, 718, 724, 73/769; 341/126–172
See application file for complete search history.

(56) References Cited

U.S. PATENT DOCUMENTS

| | | | |
|---|---|---|---|
| 6,679,055 B1* | 1/2004 | Ellis | F03G 7/06 60/527 |
| 2006/0261032 A1* | 11/2006 | Krishnamoorthy | G02B 26/0833 216/2 |
| 2009/0108193 A1* | 4/2009 | Kostiainen | H01J 49/168 250/282 |
| 2014/0264900 A1* | 9/2014 | Feyh | H01L 21/3142 257/773 |
| 2016/0211826 A1 | 7/2016 | Abdolvand | |
| 2019/0104767 A1* | 4/2019 | Hatton | A24F 40/51 |

OTHER PUBLICATIONS

T. Kobayashi, H. Okada, T. Masuda, R. Maeda, and T. Itoh, National Institute of Advanced Industrial Science and Technology (AIST), A digital output accelerometer using MEMS-based piezoelectric accelerometers and arrayed CMOS inverters with Satellite capacitors; Published May 25, 2011 online at stacks.iop.org/SMS/20/065017, 7 pages.

Yao Kun Pang, Xiao Hui Li, Meng Xiao Chen, Chang Bao Han, Chi Zhang, & Zhong Lin Wang; Triboelectric Nanogenerators as a Self-Powered 3D acceleration Sensor; ACS Publications; 2015 American Chemical Society Appl. Mater. Interfaces 2015, 7, pp. 19076-19082.

* cited by examiner

RESONANT MEMS PIEZOELECTRIC SENSOR

CROSS REFERENCE TO RELATED APPLICATIONS

This application claims the benefit of provisional application Ser. No. 62/675,249 entitled "wireless resonant piezoelectric accelerometer" filed on May 23, 2018, which is herein incorporated by reference in its entirety.

CROSS-REFERENCE TO COPENDING APPLICATIONS

This application has subject matter related to copending application Ser. No. 14/598,891 entitled "PASSIVE WIRELESS SENSOR INCLUDING PIEZOELECTRIC MEMS RESONATOR" that was filed on Jan. 16, 2015.

FIELD

This Disclosure relates to wireless piezoelectric microelectromechanical systems (MEMS) resonator-based physical parameter sensors.

BACKGROUND

Resonant sensing is a known solution for sensing physical parameters such as pressure, temperature, viscosity, acceleration, or mass. The primary advantage of resonant sensors is that their output signal provides a frequency or a phase change which can be directly coupled to digital circuitry unlike analog sensors which need signal conditioning (including amplification and filtering) and then digital conversion before being coupled to digital circuitry. Quartz, surface acoustic wave (SAW) and Microelectromechanical systems (MEMS) resonators have both been incorporated in oscillator circuits to yield a variety of sensors that generally provide high resolution or sensitivity, being the ratio of the electrical output to a mechanical input such as an acceleration.

SUMMARY

This Summary is provided to introduce a brief selection of disclosed concepts in a simplified form that are further described below in the Detailed Description including the drawings provided. This Summary is not intended to limit the claimed subject matter's scope.

This Disclosure recognizes that a capacitor designed to provide a variable capacitance in response to a changing physical parameter (variable capacitor) electrically coupled to a resonator to provide a sensor will affect the resonance frequency of the resonator, so that one can sense the physical parameter using a frequency shift of the resonator for essentially any physical parameter that will cause the variable capacitor's capacitance to change. Disclosed sensors are realized as piezoelectric MEMS sensors, where the variable capacitor and a piezoelectric MEMS resonator are on the same substrate, such as on a silicon or a silicon on insulator (SOI) substrate.

This Disclosure includes MEMS piezoelectric sensors comprising a substrate 105 having a piezoelectric layer thereon; a MEMS piezoelectric resonator including a reference electrode on a first side of the piezoelectric layer and providing a first port (port 1) for capacitor coupling comprising a capacitor coupling electrode on a side of the piezoelectric layer opposite the first side, and a second port (port 2) for excitation signal coupling comprising another electrode on the side opposite the first side. The MEMS piezoelectric resonator has a natural resonant frequency. A variable capacitor on the substrate is positioned lateral to the MEMS piezoelectric resonator having a first plate and a second plate that are connected to port 1. An antenna or an oscillator circuit is connected to port 2. Responsive to a physical parameter a capacitance of the variable capacitor changes which changes a frequency of the MEMS piezoelectric resonator relative to the natural resonant frequency to generate a frequency shift.

In the disclosed aspect where the variable capacitor comprises a mass-spring type of capacitor, the piezoelectric stiffening effect can be used, such as to produce an acceleration-dependent variable frequency signal that can be remotely interrogated. Such resonant accelerometer devices can be used in a variety of applications including as examples for wireless body movement monitoring and for wireless vibration sensing. In the disclosed aspect where the variable capacitor includes a movable plate on a diaphragm, a disclosed MEMS piezoelectric pressure sensor is realized, which can also be remotely interrogated.

DETAILED DESCRIPTION

Figure 1A:
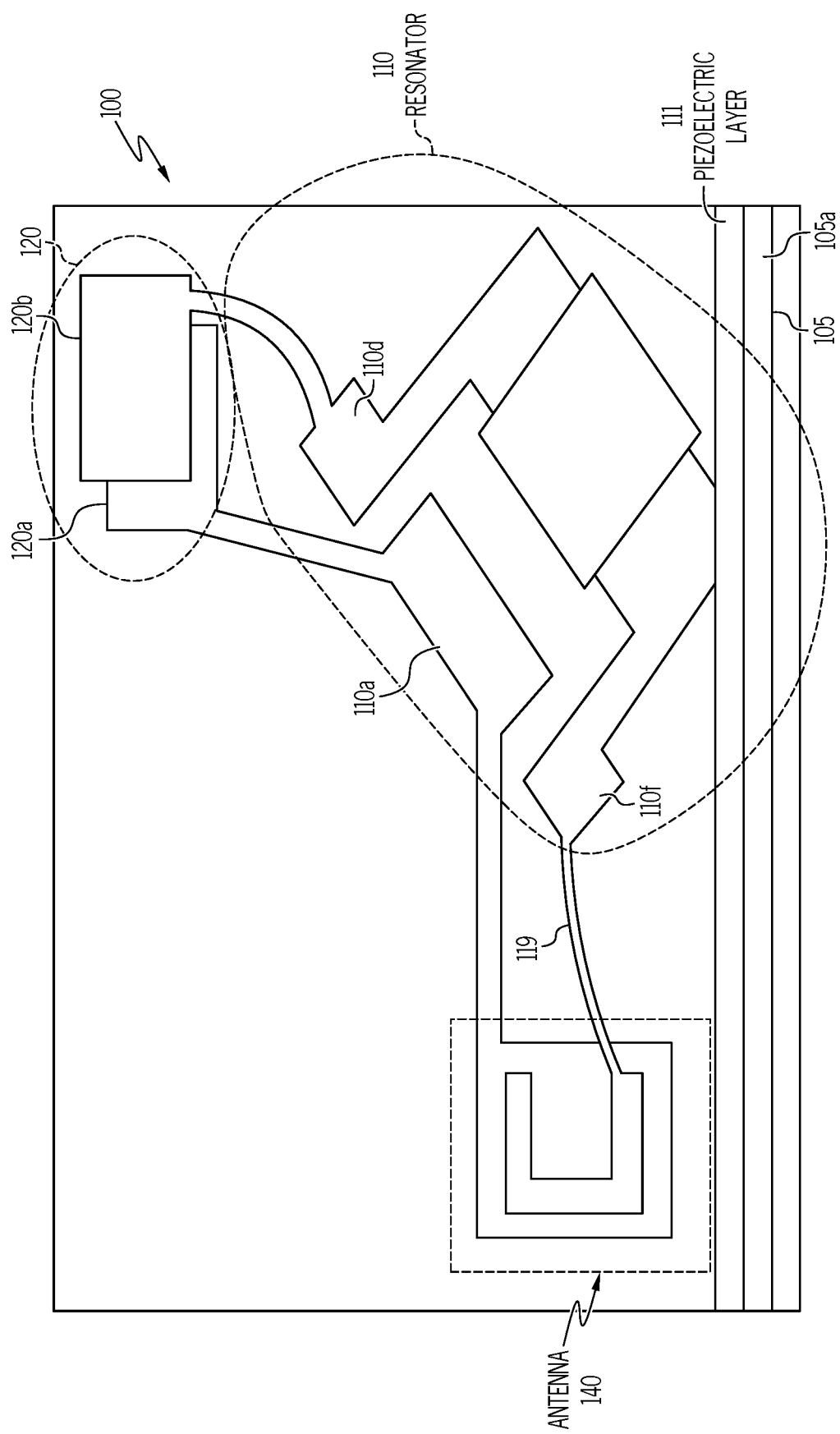
FIG. 1A is a top perspective cross-sectional depiction of an example wireless MEMS piezoelectric sensor comprising a substrate including a top substrate layer having at least one MEMS piezoelectric resonator thereon that together with a variable capacitor formed on the same substrate that it is electrically coupled to the MEMS piezoelectric resonator can be used for disclosed wireless MEMS piezoelectric sensors including acceleration sensors.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1A is a top perspective cross-sectional depiction of an example wireless MEMS piezoelectric sensor (sensor) 100 comprising a substrate 105 (e.g., silicon) including a top substrate layer 105a having at least one MEMS piezoelectric resonator 110 thereon that together with a variable capacitor 120 also see variable capacitor 120 in FIG. 1B described below) that it is electrically coupled to by one of its ports and formed on the same substrate 105 can be used for a disclosed wireless MEMS piezoelectric sensors including acceleration and pressure sensors. The MEMS piezoelectric resonator 110 includes a piezoelectric layer 111 positioned between a top metal layer or a semiconductor layer, shown as a top electrode layer which includes a 1st top electrode shown as 110d and a 2nd top electrode shown as 110f and a bottom metal or semiconductor layer (bottom electrode layer) that functions as a reference electrode shown in FIG. 1A that is provided by the top substrate layer 105a or layer 110a between the top substrate layer 105a and the piezoelectric layer 111.

The MEMS piezoelectric resonator's 110 electrodes although shown in FIG. 1A as top electrodes 110d and 110f and a bottom electrode as the top substrate layer 105a; need not be top and bottom electrode configurations, because lateral MEMS piezoelectric resonator configurations are also possible. The MEMS piezoelectric resonator 110 can comprise a contour-mode MEMS piezoelectric resonator, a thin-film piezoelectric-on-semiconductor (TPoS) resonator, or other MEMS piezoelectric resonator design.

The top electrode layer is a patterned layer that thus can provide one or more electrodes. The top electrode configuration can be a single top electrode (for a 1-port MEMS piezoelectric resonator configuration) or for a 2-port MEMS piezoelectric resonator configuration can comprise 2 or more electrodes generally described where one port gets connected to a variable capacitor referred to herein as a first port (port 1) and another port referred to herein as a second port (port 2) gets connected to either an antenna or an oscillator circuit.

The two top electrodes shown in FIG. 1A as 1st top electrode 110d and 2nd top electrode 110f thus together with the reference electrode here being the top substrate layer 105a provide 2 ports to allow for simultaneous excitation and sensing from the MEMS piezoelectric resonator. However, although shown as the top substrate layer 105a being below the piezoelectric layer 111, the ground reference electrode that can also be on the top the piezoelectric layer 111.

An on-chip antenna 140 shown as a patch antenna as an example antenna type is connected by a metal trace 119 of the top metal layer to the $2^{nd}$ top electrode 110f. Port 2 including the 2nd top electrode 110f and the reference electrode connected to the antenna 140 is thus for receiving a wireless interrogation signal from a wireless base unit or transceiver, and port 1 including the $1^{st}$ top electrode 110d and the reference electrode shown as the top substrate layer 105a or layer 110a is for connecting to the variable capacitor. The antenna 140 being connected to port 2 is thus also for wirelessly transmitting the generated (sensed) electrical signal that reflects the frequency shift in the MEMS piezoelectric resonator 110 responsive to change a physical parameter such as acceleration.

As known in the art, a patch antenna comprises a flat rectangular sheet or "patch" of metal, mounted over a larger sheet of metal called a ground plane. The patch antenna can use a patch which is about one-half wavelength long, mounted a precise distance above a larger ground plane, sometimes using a spacer comprising a dielectric between them. The antenna may also be off the substrate/chip. The on-chip antenna 140 can include antenna types other than a patch antenna.

The piezoelectric material for piezoelectric layer 111 can comprise aluminum nitride (AlN), zinc oxide (ZnO), aluminum gallium arsenide (AlGaAs), gallium nitride (GaN), quartz or other piezoelectric materials such as zinc sulfide (ZnS), cadmium sulfide (CdS), lithium tantalate (LiTaO$_3$), lithium niobate (LiNbO$_3$), or lead zirconate titanate (PZT). The piezoelectric layer 111 is a thin film layer having a thickness generally between 100 nm and 5 pins.

Figure 1B:
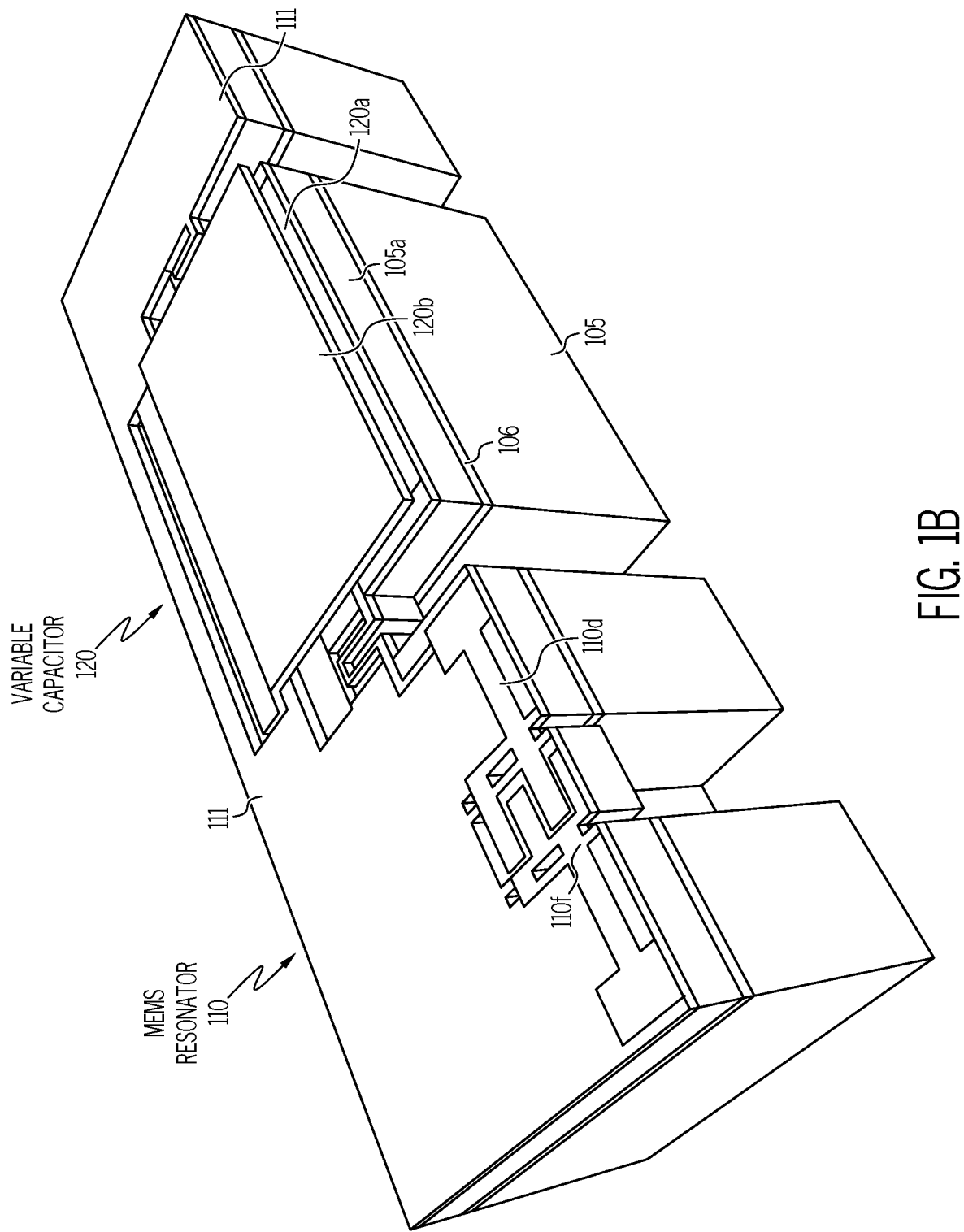
FIG. 1B shows a perspective cross sectional view of an example wireless MEMS piezoelectric sensor comprising a variable capacitor formed in a substrate including a top substrate layer that together with a MEMS piezoelectric resonator formed on the same substrate that it is electrically coupled thereto can be used for disclosed wireless MEMS piezoelectric sensors including acceleration sensors.

FIG. 1B shows a perspective cross sectional view of an example wireless MEMS piezoelectric sensor comprising a variable capacitor 120 shown having a movable mass-spring structure (movable mass being a portion of the substrate 105 etched around to be 'freed') that is electrically connected to a MEMS piezoelectric resonator 110. The substrate 105 is shown as a silicon-on-insulator (SOI) substrate including a handle wafer shown is 105, a buried silicon oxide layer 106, and a top silicon layer 105a. The variable capacitor 120 includes a movable element such as a spring mass that in response to an applied acceleration tied to one of its plates, with its plates shown in FIG. 1B as a top plate 120b as a fixed plate over and spaced apart by a dielectric including in one arrangement airgap from a bottom plate 120a, where the plate on the movable mass shown is the bottom plate 120a in FIG. 1B (and FIG. 1A) which moves responsive to a change in physical parameter such as acceleration relative to a fixed (stationary) other plate that is the top plate 120b shown in FIG. 1B (and FIG. 1A).

The variable capacitor's 120 movable mass which comprises the substrate 105 which is 'freed' by an etch with an oxide layer 106 then substrate layer 105a thereon has metal covering it shown as plate 120a that acts as a movable element, while the other (second) plate shown as plate 120b in FIG. 1B is a stationary element, that can be on one side or both sides of the movable mass, depending on the plate coverage of the movable mass and its movement type. The displacement of the movable mass is proportional to the acceleration.

The MEMS piezoelectric resonator 110 is shown having a 1st top electrode 110d, a 2nd top electrode 110f, and a bottom electrode that although not visible in FIG. 1B (but see bottom electrode 110a in FIG. 1C described below) is a thin layer between the piezoelectric layer 111 and the top substrate layer 105a. Although not shown the top plate 120b is connected to the bottom plate 110a through an etched region of the etched piezoelectric layer 111, and the bottom plate 120a of the variable capacitor 120 is electrically connected to the 1st top electrode 110d. As the variable capacitor 120 is connected to port 1 of the MEMS resonator 110, the top plate 120b of the variable capacitor 120 can be connected to the bottom electrode 110a, and the bottom plate 120a of the variable capacitor 120 can be connected to the 1st top electrode 110d.

Figure 1C:
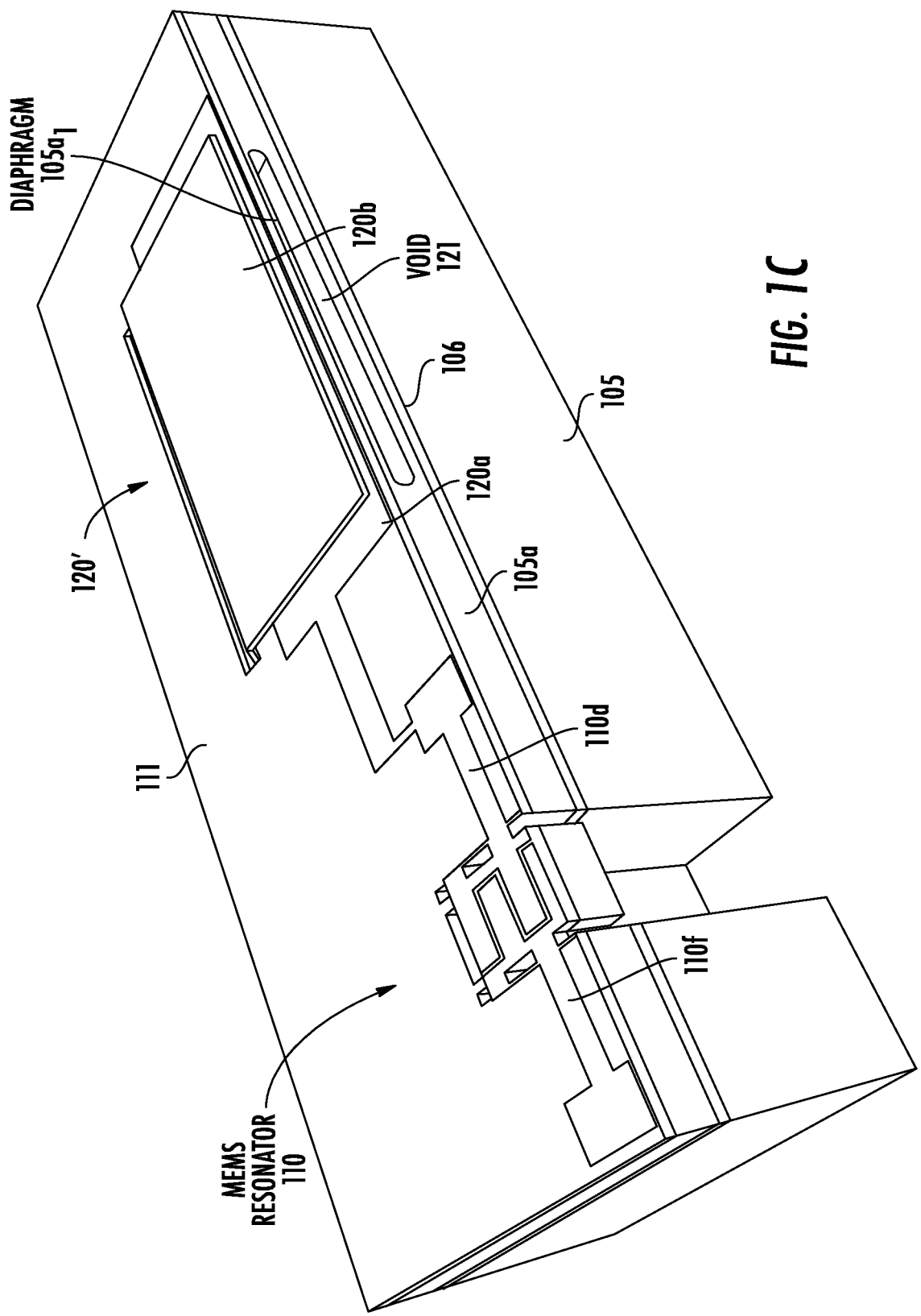
FIG. 1C shows a perspective cross sectional view of an example wireless MEMS piezoelectric sensor comprising a variable capacitor including a movable bottom electrode formed in a top substrate layer of a substrate that together with a MEMS piezoelectric resonator formed on the same substrate that is electrically coupled to can be used for disclosed wireless MEMS piezoelectric pressure sensors.
Figure 1D:
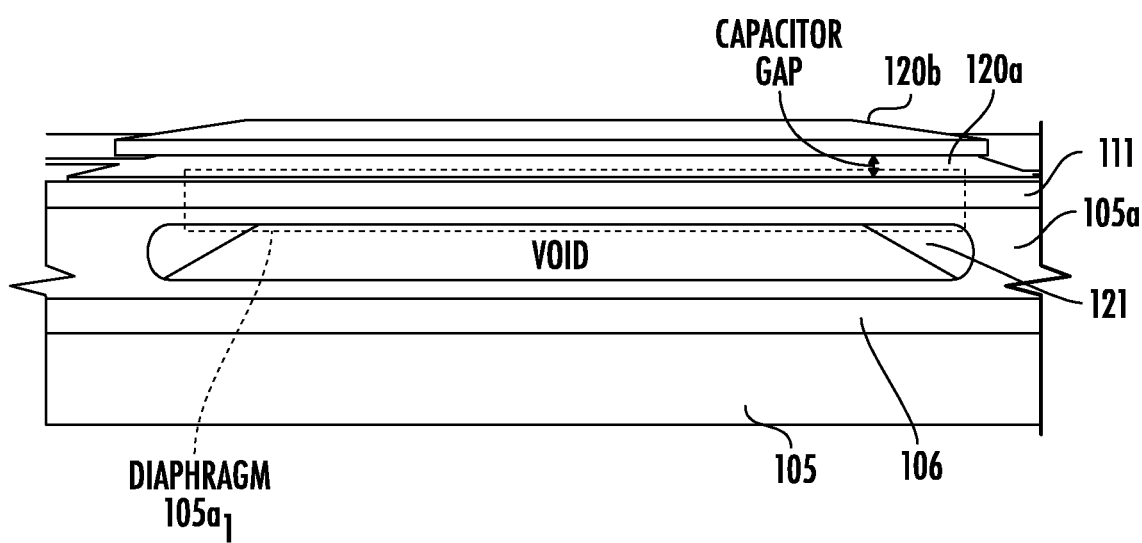
FIG. 1D is a front cross-sectional view of a variable capacitor including the movable bottom electrode shown in FIG. 1C.

FIG. 1C shows a perspective cross sectional view of an example wireless MEMS piezoelectric sensor comprising a variable capacitor 120' including a movable bottom electrode formed in a top substrate layer 105a of a substrate 105 that together with a MEMS piezoelectric resonator 110 formed on the same substrate that is electrically coupled to (described herein as coupled to port 1 being the 1st top electrode 110d and to the bottom electrode 110a) can be used for disclosed wireless MEMS piezoelectric pressure sensors. As noted above, port 2 comprising the $2^{nd}$ top electrode 110f and the bottom electrode 110a can be used to connect to an antenna or an oscillator circuit. FIG. 1D is a front cross-sectional view of a variable capacitor including the movable bottom electrode shown in FIG. 1C that shows a capacitor gap (generally an air gap) between the plates 120b and 120a.

The movable bottom electrode comprises the bottom metal layer 120a on the piezoelectric layer 111 on a thin region of the substrate surface layer 105a shown as diaphragm $105a_1$ which is over a void 121 formed in the semiconductor surface layer 105a. The diaphragm $105a_1$ generally has a thickness in the range of 100s of nm to a few µms, while the piezoelectric layer 111 as noted above is also a thin layer. Accordingly, the diaphragm $105a_1$ can flex and thus cause a change in the capacitance of the variable capacitor 120' responsive to a change in pressure or a change in another physical parameter.

The variable capacitor 120' in this example is generally formed out of a fixed top plate 120b 'hanging' above the substrate 105 that is over a dielectric (described as an airgap as the capacitor gap) that is over the bottom plate 120a. In this example the bottom electrode 120a that is a movable electrode is connected to the top electrode of the MEMS piezoelectric resonator 110 and the top electrode 120b that is a fixed electrode is grounded in operation since it is connected to the bottom electrode 110a (ground reference) of the MEMS resonator.

The movable bottom plate 120a can be formed by depositing a metal or metal alloy on a diaphragm $105a_1$ over a void 121 that can be formed for example using "silicon on nothing" process, where the void 121 is in a partial vacuum and is connected to one of the top electrodes (110d or 110f) of the MEMS piezoelectric resonator 110. The connection of the capacitor's top plate 120b and bottom plate 120a to the MEMS resonator's 110 top electrode(s) 110d or 110f and bottom electrode 110a can be reversed depending on the fabrication process. For example, the bending plate can be connected to either a top or the bottom electrode of the MEMS piezoelectric resonator 110 and vice versa for the hanging electrode (the top electrode 120b in this example which is fixed)

Due to the pressure gradient between the void 121 (in most cases a partial vacuum) and the environment, the diaphragm $105a_1$ is bent and as the pressure changes, and when the degree of such bending is changed, this results in a change in the capacitance which arises from changes in the distance between the capacitor plates 120a and 120b, where the capacitance is proportional to the change in resonant frequency of the MEMS piezoelectric resonator 110.

Figure 2A:
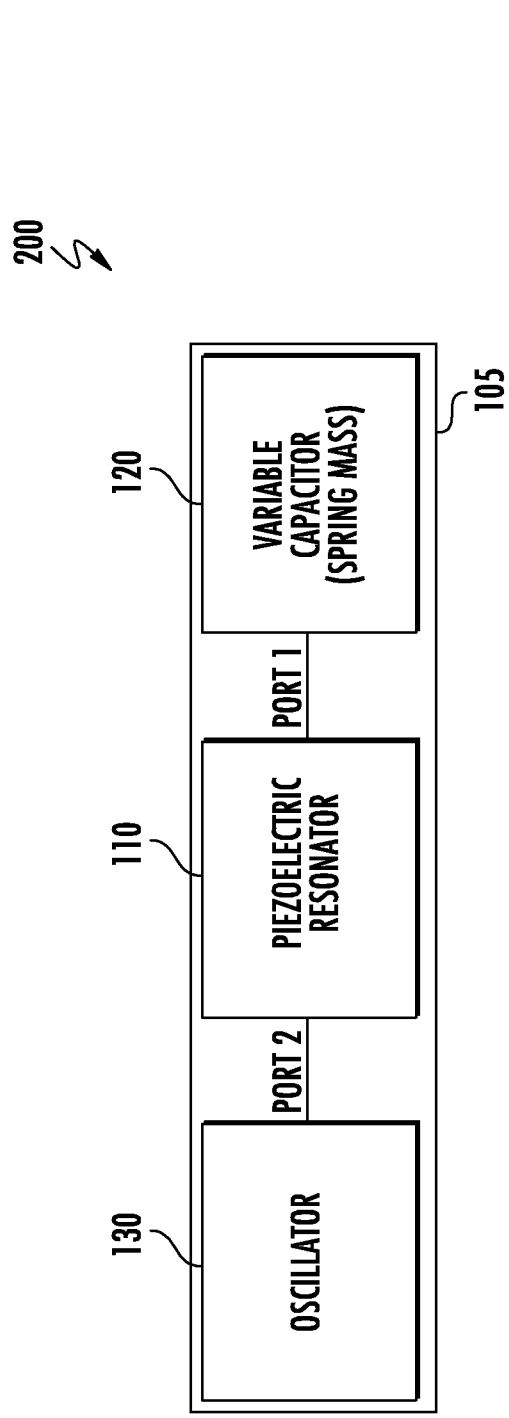
FIGS. 2A and 2B are simplified block diagrams representing the main components of disclosed resonant MEMS piezoelectric sensor systems, with FIG. 2A showing a MEMS piezoelectric sensor comprising an on-chip oscillator circuit electrically coupled to the MEMS piezoelectric resonator, and FIG. 2B showing a MEMS piezoelectric sensor comprising a MEMS piezoelectric resonator electrically coupled to an antenna that communicates with a remotely located wireless transceiver.
Figure 2B:
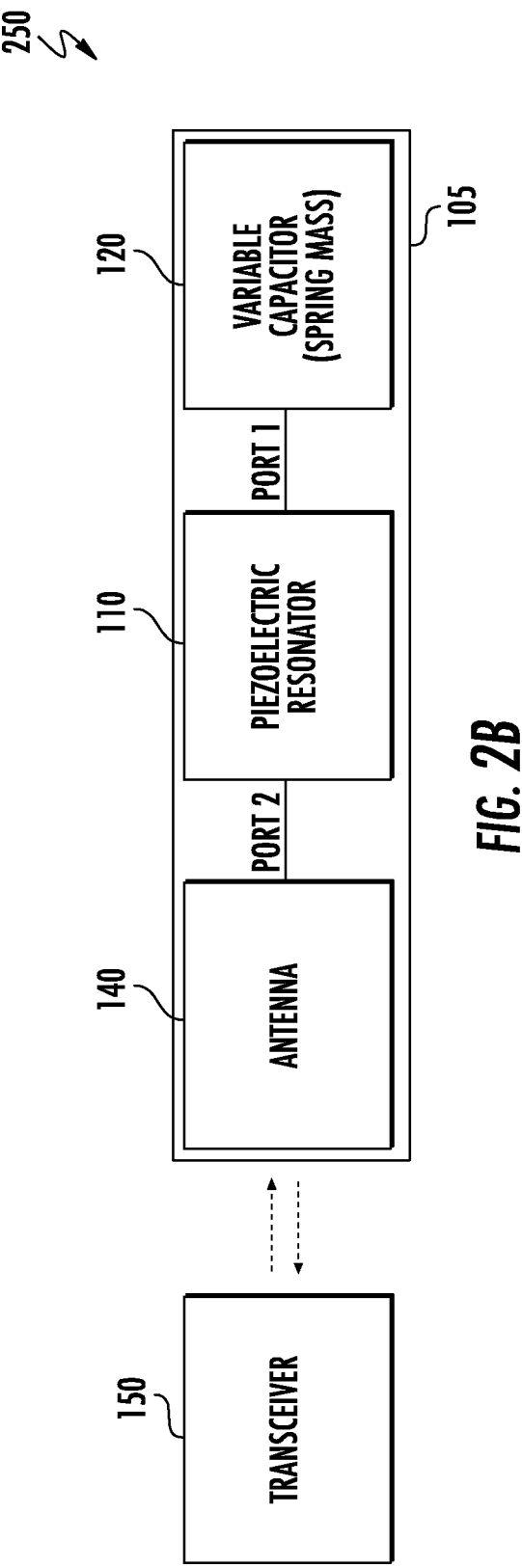

FIGS. 2A and 2B are simplified block diagrams representing the main components of disclosed resonant MEMS piezoelectric sensor systems, with FIG. 2A showing a MEMS piezoelectric sensor 200 comprising an on-chip oscillator circuit 130 electrically coupled by port 2 to the MEMS piezoelectric resonator 110 and the variable capacitor 120 coupled by port 1. In the resonant MEMS piezoelectric sensor 200 in FIG. 2A the output node of the oscillator circuit 130 provides the frequency output and the MEMS piezoelectric resonator 110 is in a feedback loop. The oscillator circuit 130 can force the MEMS piezoelectric resonator into oscillation by applying an excitation signal to port 2 with a frequency of the excitation signal that is within about 5% of the natural resonant frequency of the MEMS piezoelectric resonator 110.

FIG. 2B shows a MEMS piezoelectric sensor 250 comprising a MEMS piezoelectric resonator 110 electrically coupled by port 2 to an antenna 140 that communicates with a remotely located wireless transceiver 150, where again the variable capacitor 120 is coupled to the MEMS piezoelectric resonator 110 by port 1. The MEMS piezoelectric sensor shown as 250 in FIG. 2B lacks the oscillator circuit 130 shown in FIG. 2A, but instead includes an antenna 140 connected to port 2 of the MEMS piezoelectric resonator 110 for communicating (receiving a stimulation signal and transmitting a sensing signal) with a remote wireless transceiver shown as wireless transceiver 150.

The substrate 105 can for example comprise a silicon substrate, or can comprise as noted above a SOI substrate. As noted above, the piezoelectric layer 111 is above the top substrate layer 105a. For acceleration sensing as noted above the variable capacitor 120 can comprise a mass-spring structure including a movable element coupled to one of its plates, such as the bottom plate 120a, which transforms an applied acceleration or other physical parameter stimulus into a change in the gap between its plates in the case of parallel plate capacitor configuration, and/or the overlap area of electrode plates of the capacitor in the case of an interdigitated finger capacitor configuration, resulting in a capacitance change of the variable capacitor 120. To understand the relation of a mechanical motion to a change in capacitance for a variable capacitor, the approximation for a parallel plate capacitor without fringing effects may be considered generally sufficient:

$$C=(\varepsilon A)/d$$

with C being the capacitance of the variable capacitor, A being the surface area of the capacitor plates, d the gap thickness (dielectric) between the plates, and ε the permittivity of the dielectric material in the gap. For an example of a parameter change, an increase in the gap thickness due to a movement of the movable element (e.g. bottom plate 120a) may provide a decrease in the capacitance of the variable capacitor.

The respective plates 120b, 120a of the variable capacitor 120 are connected to the respective MEMS piezoelectric resonator electrodes (one of 110d and 110f and 110a as a reference electrode) of the piezoelectric resonator 110, where the natural center resonant frequency of the MEMS piezoelectric resonator 110 can be set by MEMS design as known in the art through variation of device/electrode geometry/shape to be within a designated frequency band, for example in the industrial, scientific and medical (ISM band) which is 902 MHz to 928 MHz.

Figure 3A:
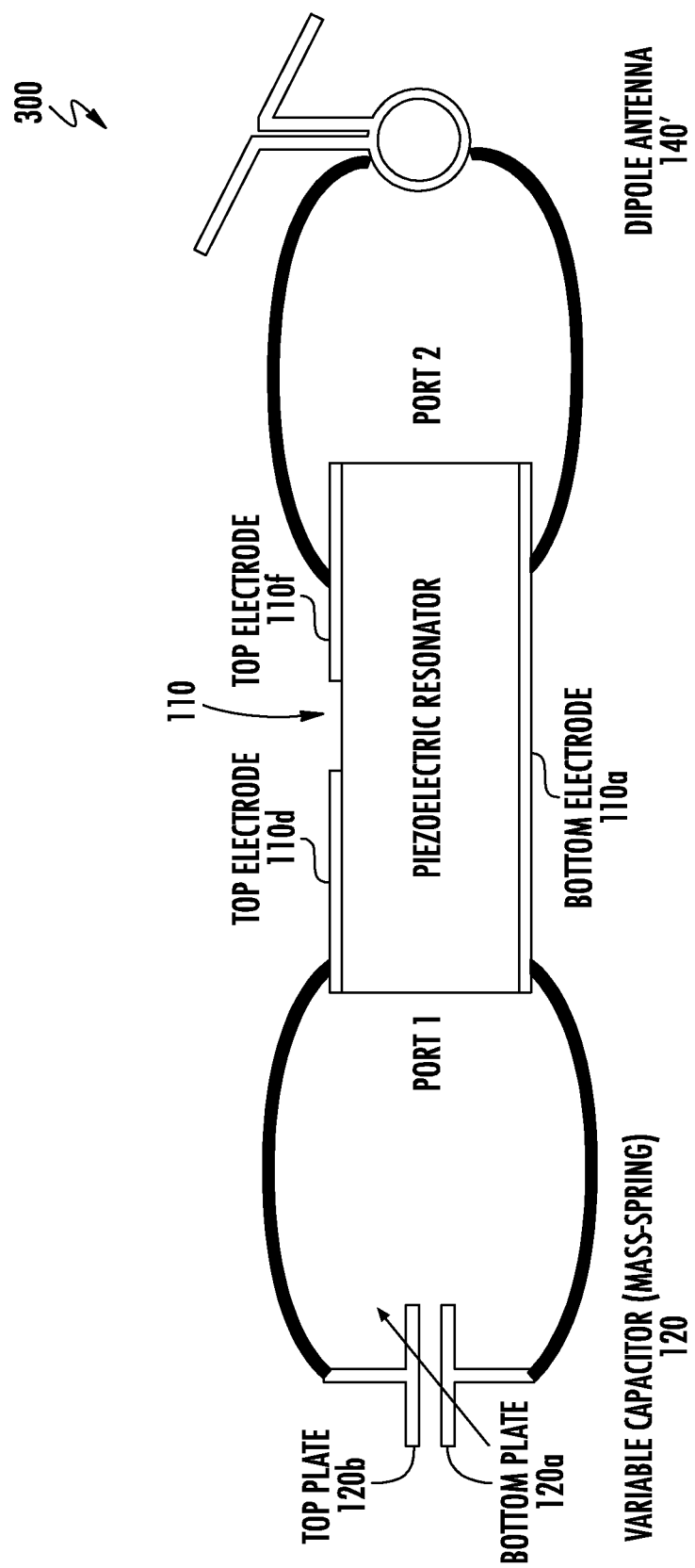
FIG. 3A is a simplified schematic of a passive wireless MEMS piezoelectric sensor showing the electrical connections between the different MEMS sensor components shown as a MEMS piezoelectric resonator, a variable capacitor, and an antenna shown is a dipole antenna.

FIG. 3A is a simplified schematic of a passive wireless MEMS piezoelectric sensor 300 such as an accelerometer clearly showing electrical connections between its respective components. The MEMS piezoelectric resonator 110 includes first set of electrodes with 1st top electrode 110d and bottom electrode 110a as port 1, the 2nd top electrode 110f and bottom electrode 110a shown as port 2. These two ports can be electrically isolated, or one of the electrodes (for examples the bottom electrode) of the MEMS piezoelectric resonator 110 as shown in FIG. 3A can be shared by both port 1 and port 2.

The two electrodes 110d and 110a defining port 1 are connected to the respective plates of the variable capacitor 120. For example, the bottom electrode 110a of the MEMS piezoelectric resonator 110 can be connected to the movable bottom plate 120a of the variable capacitor 120, while the fixed top plate 120b of the variable capacitor 120 can be connected to the 1st top electrode 110d. Port 2 is shown connected to an antenna shown as a dipole antenna 140' which can also be a planar antenna, for example made of printed metal on a flexible substrate analogous to a radio-frequency identification (RFID) tag.

Figure 3B:
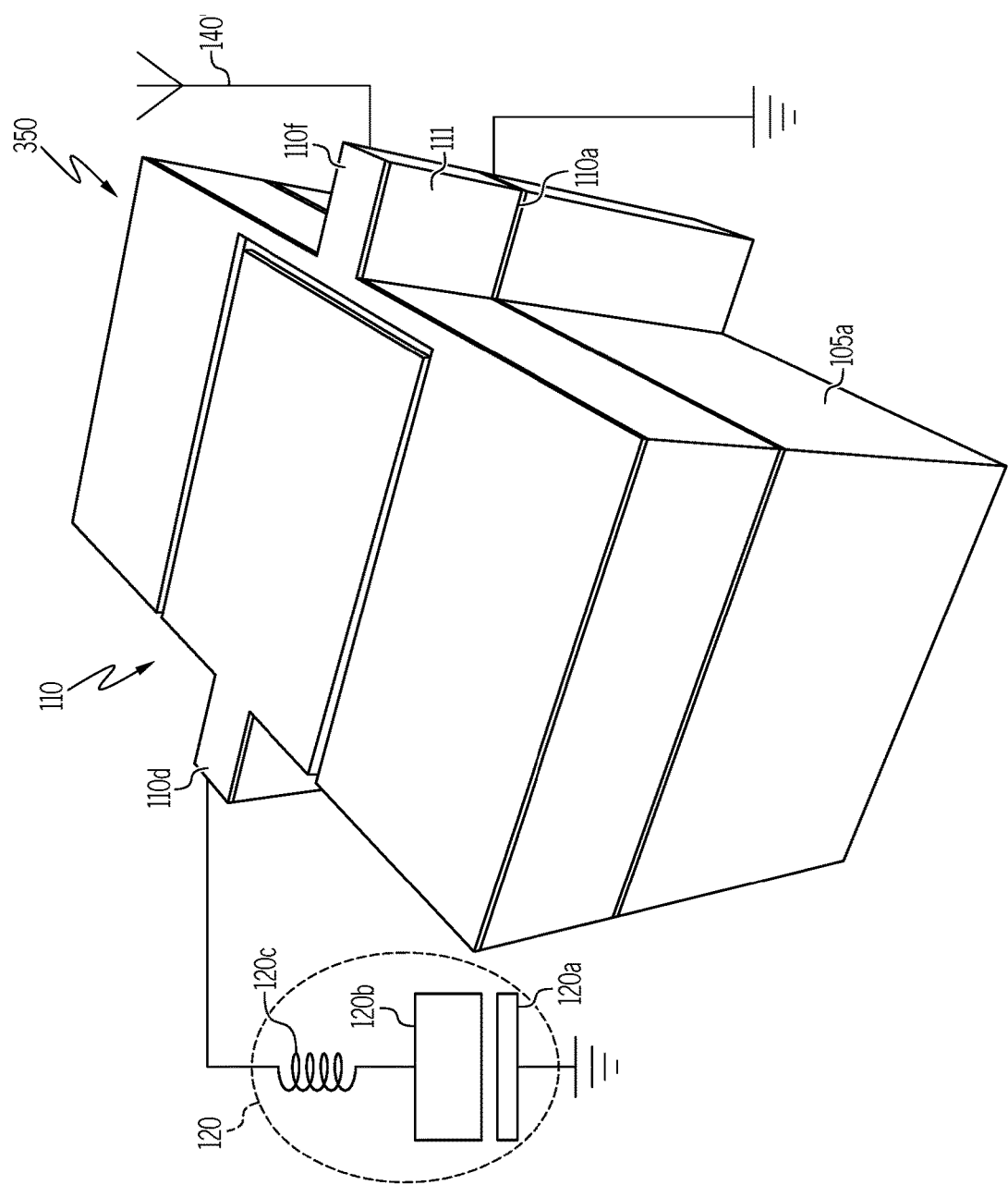
FIG. 3B is a simplified schematic showing an example of a MEMS piezoelectric resonator electrically coupled to an antenna from one port (right side) and to a variable capacitor with a mass-spring structure on the MEMS piezoelectric resonator's other port (left side).

FIG. 3B is a simplified schematic of an example resonant MEMS piezoelectric sensor 350 comprising a MEMS piezoelectric resonator 110 having its port 2 comprising $2^{nd}$ top electrode 110f and bottom electrode 110a electrically connected to an antenna 140' on the right side of this FIG, and port 1 compressing the $1^{st}$ top electrode 110d and reference electrode 110a electrically connected to the plates 120b, 120a of the variable capacitor 120 that is configured as a mass-spring system on the left side of this FIG. The variable capacitor 120 is depicted by a top plate 120b above a bottom plate 120a that is shown grounded, with a spring 120c representing the mass-spring system.

Figure 4A:
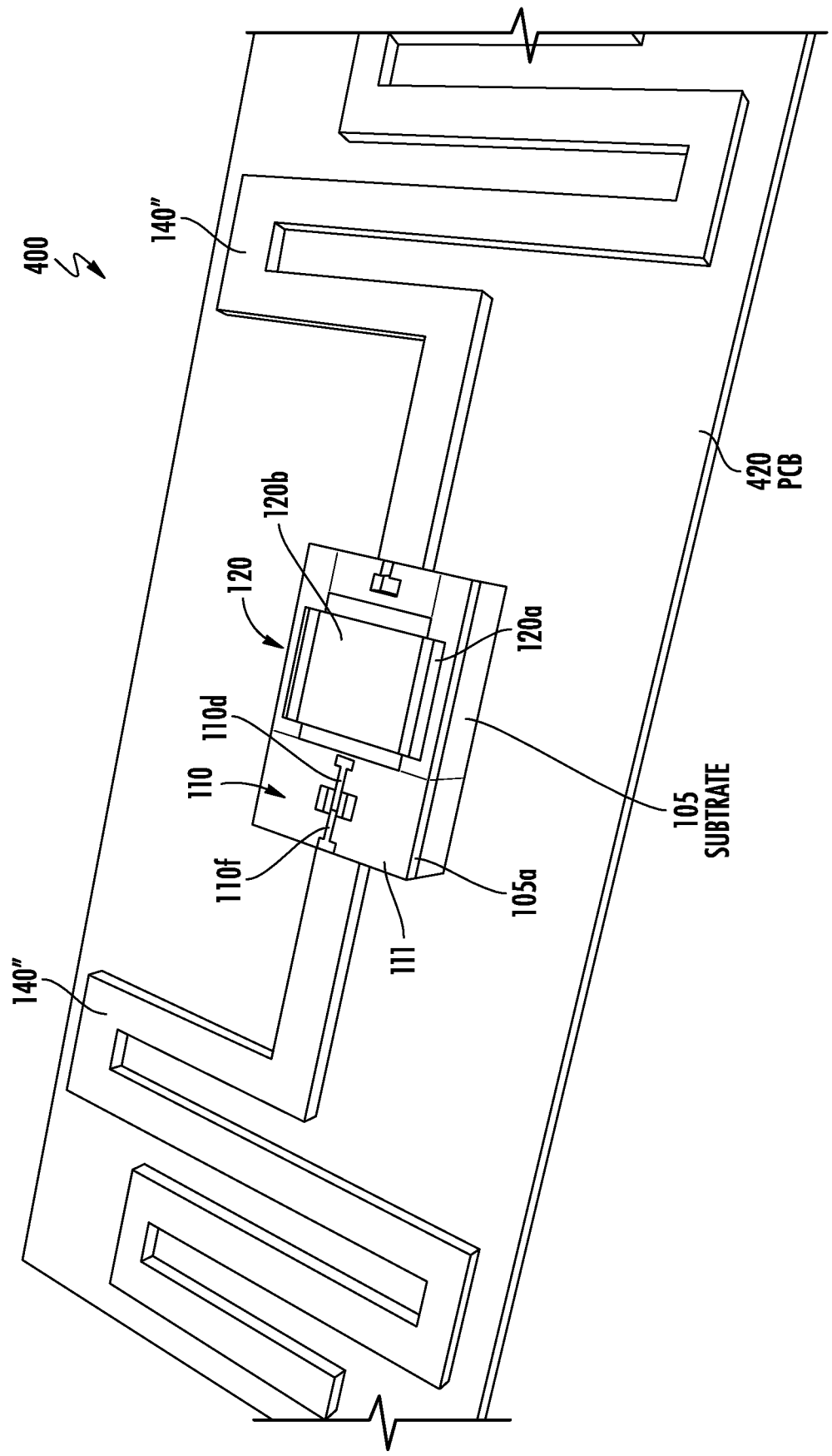
FIG. 4A is a depiction of an example wireless sensor tag in which the wireless MEMS piezoelectric sensor shown in FIG. 3A is connected to a planar antenna.

FIG. 4A is a depiction of an example wireless sensor tag 400 in which the passive wireless MEMS piezoelectric resonant sensor 300 shown in FIG. 3A is now shown on a top substrate layer 105a of a substrate 105, that is mounted on a printed circuit board (PCB) 420) which has an antenna 140" on its top surface. As noted above the substrate 105 can comprise a SOI substrate and the MEMS piezoelectric resonator's 110 body can include a piezoelectric layer (shown above as 111) positioned between metal layers and stacked on top of the top silicon layer 105a of the substrate 105. In FIG. 4A, the top plate 120b of the variable capacitor 120 can be connected to the bottom electrode 110a of the MEMS piezoelectric resonator's 110 which is also connected to the antenna's ground plane, and the bottom plate 120a of the variable capacitor 120 can be connected to one of the MEMS piezoelectric resonator's 110 top electrodes (110d or 110f).

In operation of the wireless sensor tag 400, a change in the capacitance of the variable capacitor 120 responsive to a physical parameter change such as an acceleration will result in a change in the resonance frequency of the MEMS piezoelectric resonator 110 through the piezoelectric stiffening effect. The electrical impedance between a top electrode and the bottom electrode 110a of a MEMS piezoelectric resonator 110 affects the frequency shift by a mechanism called the piezoelectric stiffening effect. In other words, the MEMS piezoelectric resonator 110 can be utilized as a capacitor-to-frequency convertor for the accurate measurement of the frequency at extremely low powers, even below 100 µW in the oscillator configuration, or even remotely (passively) where a sine wave with a frequency in the vicinity of the natural resonant frequency of the MEMS piezoelectric resonator 110 from a transceiver is used to force the MEMS piezoelectric resonator 110 into oscillation, and once the excitation signal is removed, the MEMS resonator 110 rings down (amplitude decreases as a function of time) at the resonance frequency which is detected by the transceiver, such as through time-gating and performing Fast Fourier Transform (FFT) on the signal.

The variable capacitor 120 can be a parallel plate capacitor formed between an electrical conductor deposited directly on a portion of the substrate 105 (i.e. the mass) that is suspended by flexible beams (i.e. springs) providing a bottom plate 120a on a movable mass and a second conductor as the top plate 120b suspended over the bottom plate/movable mass which will results in an out-of-plane axis of sensitivity. However, variable capacitors in this Disclosure can be designed in a variety of other configurations including interdigitated finger capacitors, and can also be design to accommodate any arbitrary axis (x, y or z) of sensitivity.

Figure 4B:
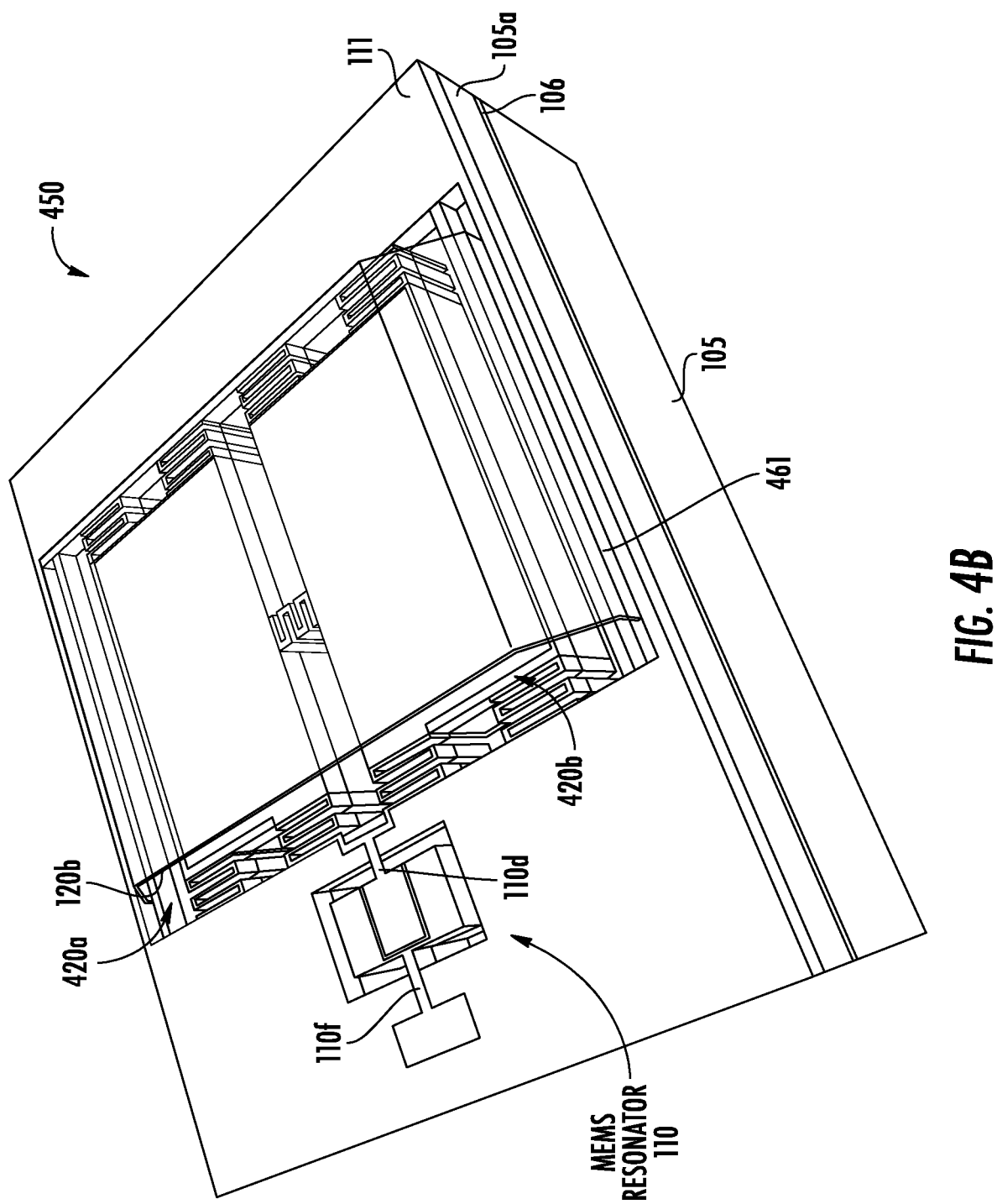
FIG. 4B is a schematic of a MEMS piezoelectric sensor that has two variable capacitors, each having mass-spring structures that are electrically connected to the MEMS resonator, where the variable capacitors provide multiple mass-springs having different spring properties can be used to cover different acceleration ranges based on their mass and stiffness or different axes of movement due to an applied acceleration.

FIG. 4B is a schematic of a MEMS piezoelectric sensor 450 that has 2 variable capacitors 420a and 420b each having mass-spring structures electrically connected to the MEMS resonator 110. The variable capacitors 420a and 420b can comprise mass-springs having different spring properties. To generate the different spring properties, one can change the geometry (e.g. length, width) of the spring (suspending beam), that can be used for example in order to cover different acceleration ranges based on their mass and stiffness or axes of applied acceleration. The long skinny patch 461 is the exposed bottom electrode 110a of the MEMS piezoelectric resonator 110 which the top plate 120b (shown as being transparent) of the variable capacitor 120 can be connected to. As before 120a is the bottom metal layer covering the suspended masses (can be seen through the top plate 120b depicted as transparent to reveal features below), and is connected to one of the MEMS piezoelectric resonator's 110 top electrodes (110*d* or 110*f*).

A believed to be unique feature disclosed wireless MEMS piezoelectric sensors is in its application as a wireless passive accelerometer, a velocity sensor, a motion sensor, or as a pressure sensor (variable capacitor structure having a flexible diaphragm 1050. For passive operation on port of the MEMS piezoelectric resonator 110 described herein as port 2 is directly coupled to an antenna such as shown in FIG. 2B and FIG. 3A, and the resonant frequency can be remotely interrogated by a wireless pulsed excitation signal, such as depicted in FIG. 2B (received by antenna 140 that is transmitted by transceiver 150) and FIG. 3A. The resolution (or sensitivity) of this MEMS piezoelectric-based sensing system is primarily dependent on the MEMS piezoelectric resonator's 110 coupling factor ($K^2$) and quality factor (Q).

Regarding the wireless sensing of acceleration, velocity, or motion, or pressure, a wireless MEMS piezoelectric-based sensing scheme can be used. Disclosed wireless circuit-less (no needed electronics; thus passive) sensors such as accelerometers or pressure sensors can achieve very high resolution and detection range, with as described above the resolution being mainly dependent on the resonator's coupling factor and quality factor—(i.e. $K^2$ and Q). An attractive feature of such wireless MEMS piezoelectric sensors is the simplicity of a disclosed wireless sensor tag where no electronics are needed, such as shown in FIG. 4A described above. As noted above the MEMS piezoelectric resonator can comprise a resonant cavity that can be fabricated on SOI substrate. The piezoelectric layer 111 can be either bonded (for the case of LN) or sputtered (for aluminum nitride (AlN)) directly on a silicon surface. The MEMS piezoelectric resonator's 110 top electrodes 110*d*, 110*f* can be interdigitated electrodes patterned on top of a piezoelectric film 111 and the resonant mode can be excited through establishing an alternating voltage applied between the two sets of electrodes (110*d*/110*a* and 110*f*/110*a*). The silicon device layer shown above as the substrate layer 105*a* can be relatively thin, such as 1 μm to 10 μm thick. (generally a few 100s of nm to 10s of μms)

The MEMS piezoelectric resonator 110 may have center resonant frequency which as noted above can be in the ISM band (e.g. 902-928 MHz), where one coupled to a variable capacitor 120 can be directly connected to a dipole antenna 140' as shown in FIG. 3A. Movements/accelerations of the sensor translates into movements of a lumped mass to which the movable electrode (typically the bottom electrode 120*a*) of the variable capacitor 120 is connected which results in a change of capacitance/impedance respectively. The capacitance change will result in a shift in the resonance frequency of the MEMS piezoelectric resonator 110 through the piezoelectric stiffening effect. Therefore, by measuring the frequency shift of the MEMS piezoelectric resonator 110 the corresponding acceleration or pressure can be extracted. The MEMS piezoelectric resonator 110 can be forced into oscillation by applying a signal such as a sine wave with a frequency in the vicinity of the resonator's natural resonant frequency. As noted above, after the excitation is removed, the MEMS piezoelectric resonator 110 rings at its natural resonant frequency ($\omega_0$) with an exponentially decaying signal amplitude ($e^{-t/\tau}$), where the time constant τ is equal to $$\frac{2Q}{\omega_0}$$

by definition. During this period, as noted above, the resonant frequency of the piezoelectric resonator can be determined by time gating this signal and taking a Fast Fourier Transform (FFT).

Figure 5:
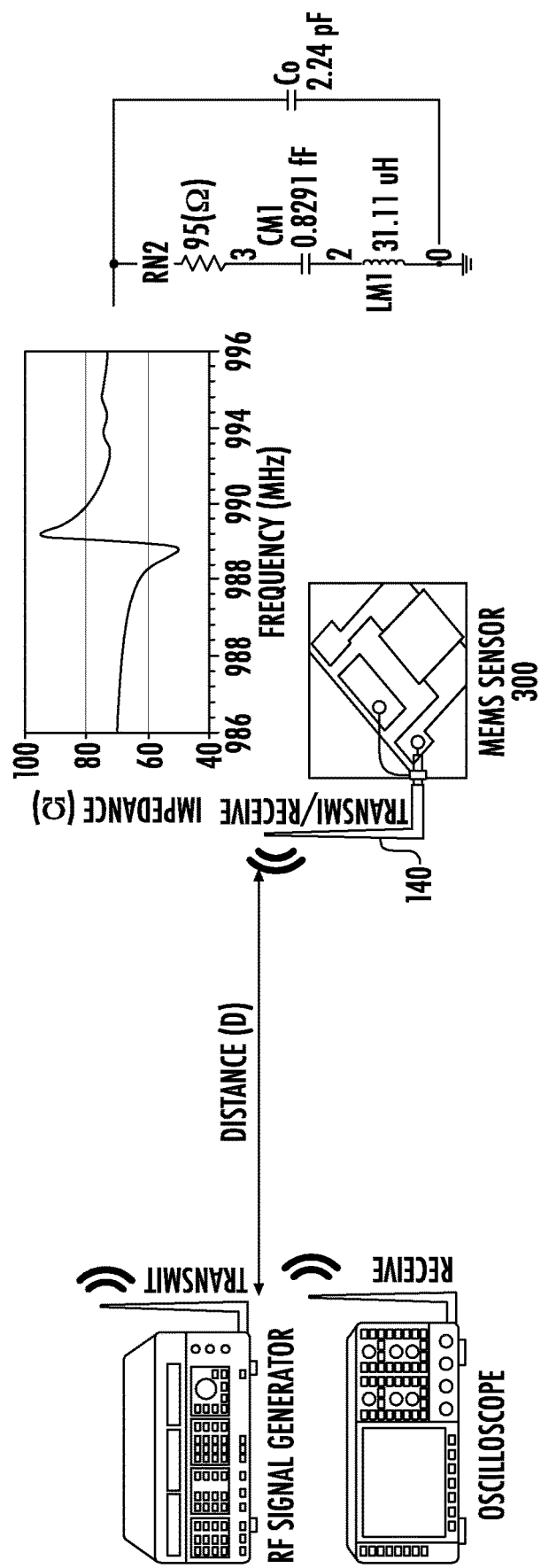
FIG. 5 shows a schematic view of an example passive wireless MEMS piezoelectric-on-silicon sensor arrangement. An impedance plot and equivalent Butterworth van Dyke (BVD) model of the MEMS piezoelectric resonator are both provided.
Figure 6A:
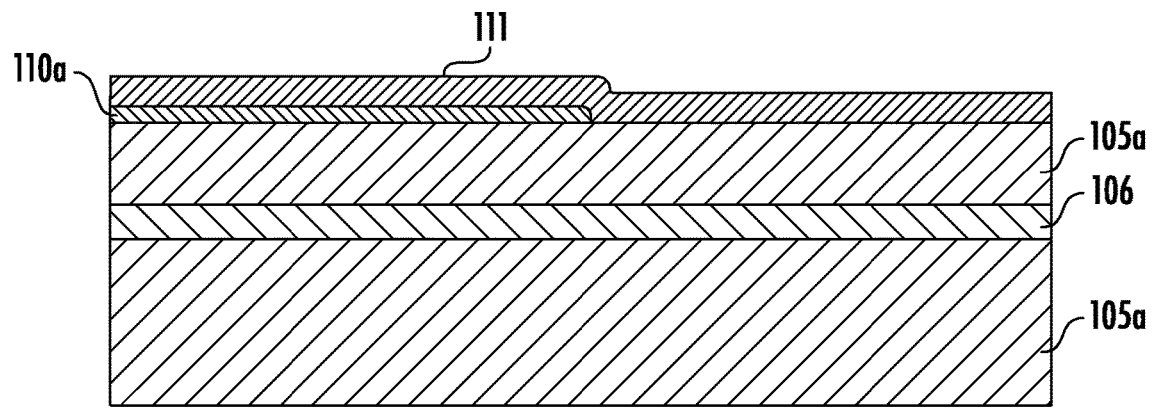
FIGS. 6A-E are successive cross-sectional depictions showing steps in an example fabrication process for forming a disclosed MEMS piezoelectric accelerometer including a MEMS piezoelectric resonator electrically coupled to a variable capacitor comprising a mass-spring structure.
Figure 6B:
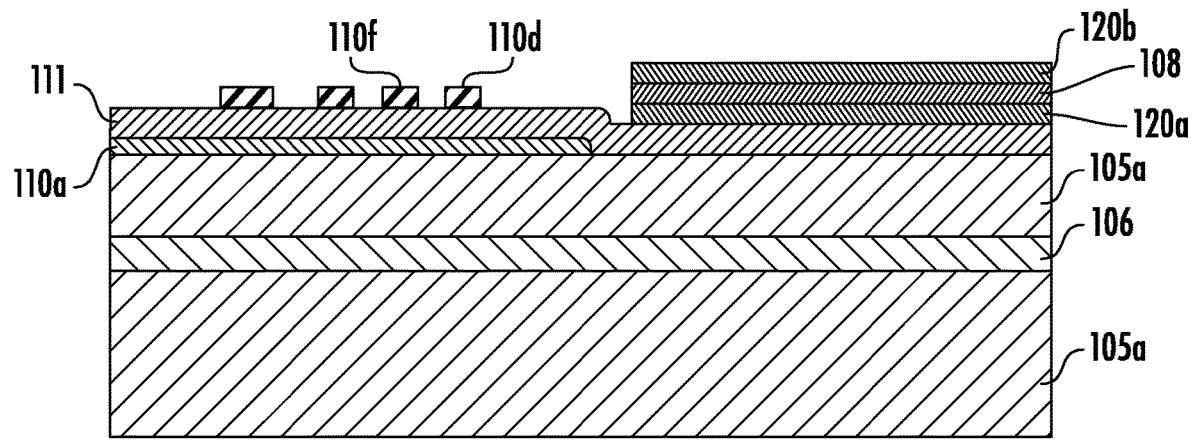
Figure 6C:
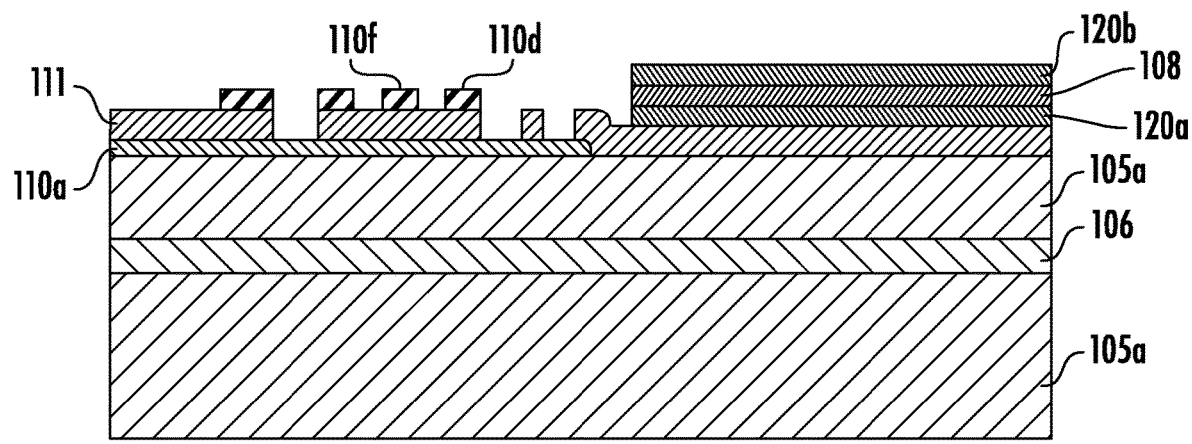
Figure 6D:
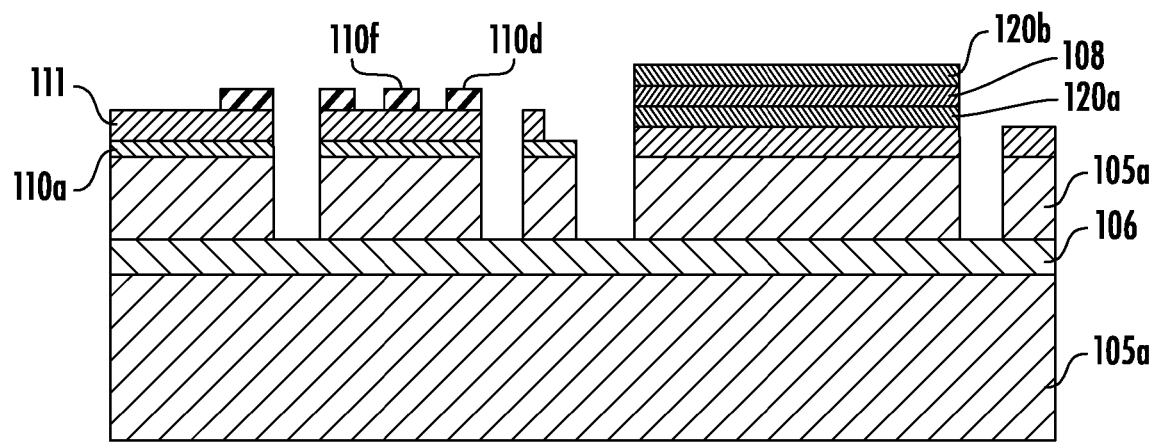
Figure 6E:
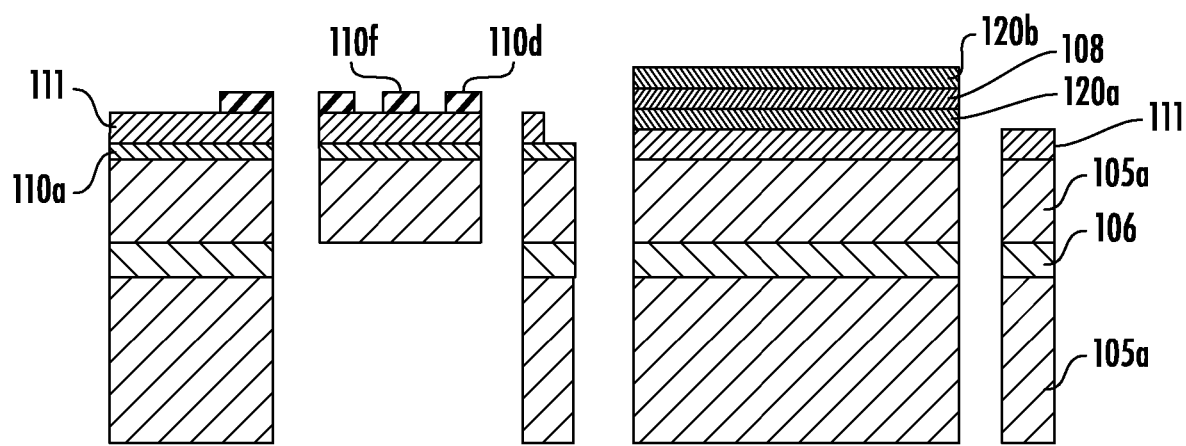
Figure 7A:
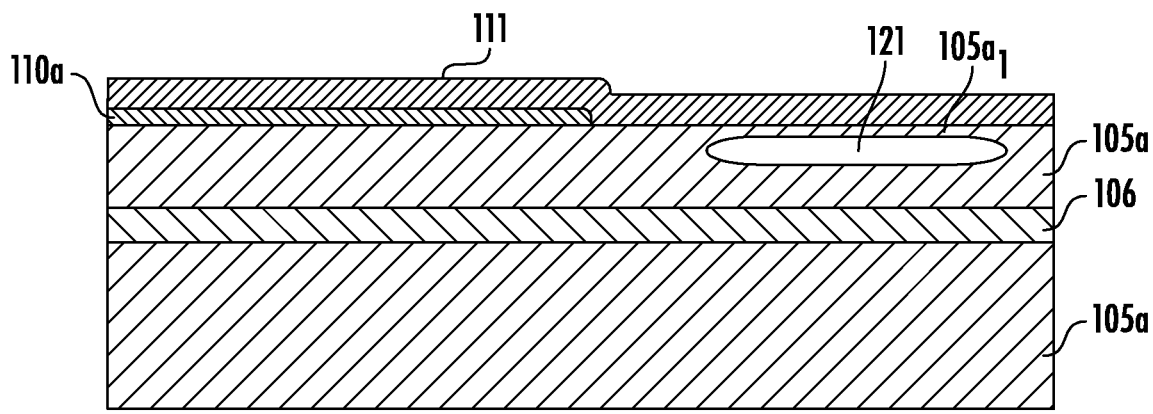
FIGS. 7A-E are successive cross-sectional depictions showing steps in an example fabrication process for forming a disclosed MEMS piezoelectric pressure sensor including a MEMS piezoelectric resonator electrically coupled to a variable capacitor that includes a movable bottom electrode.
Figure 7B:
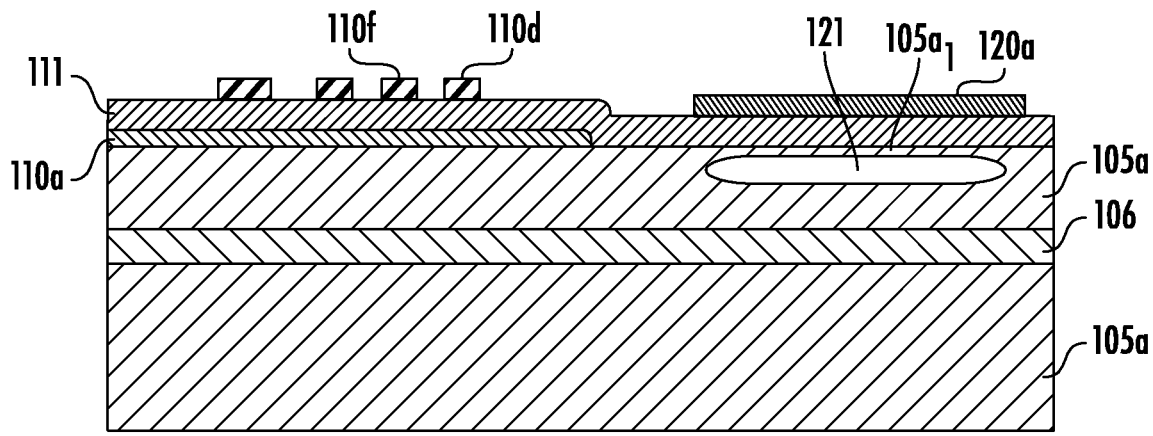
Figure 7C:
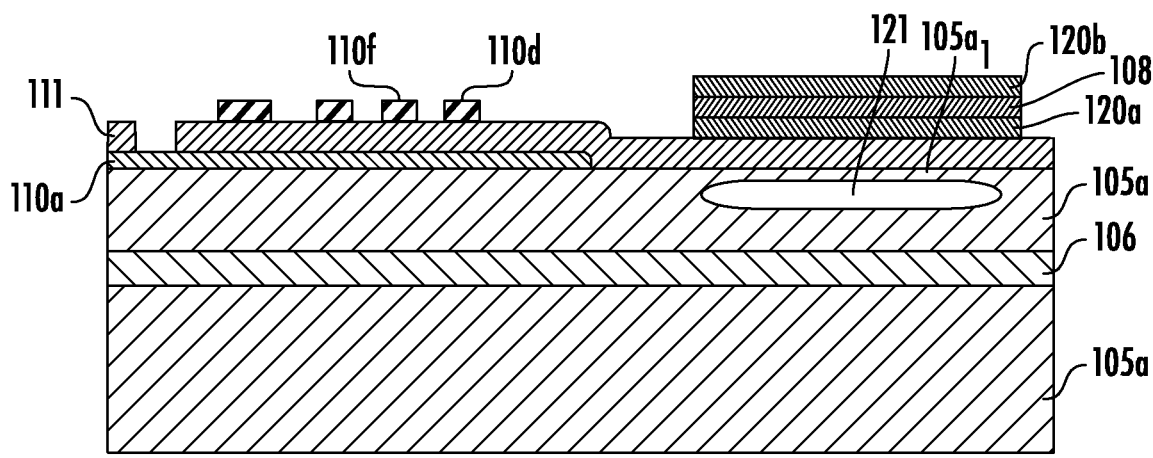
Figure 7D:
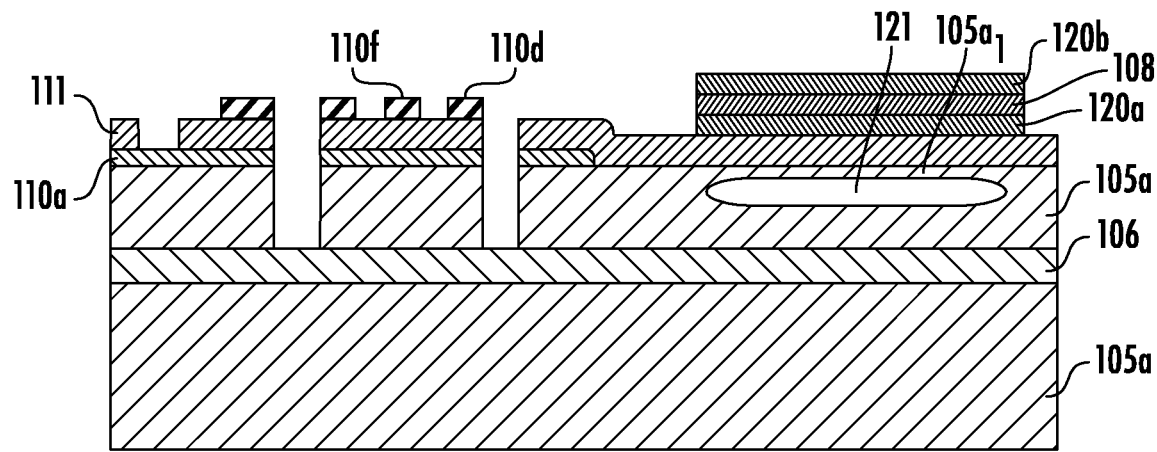
Figure 7E:
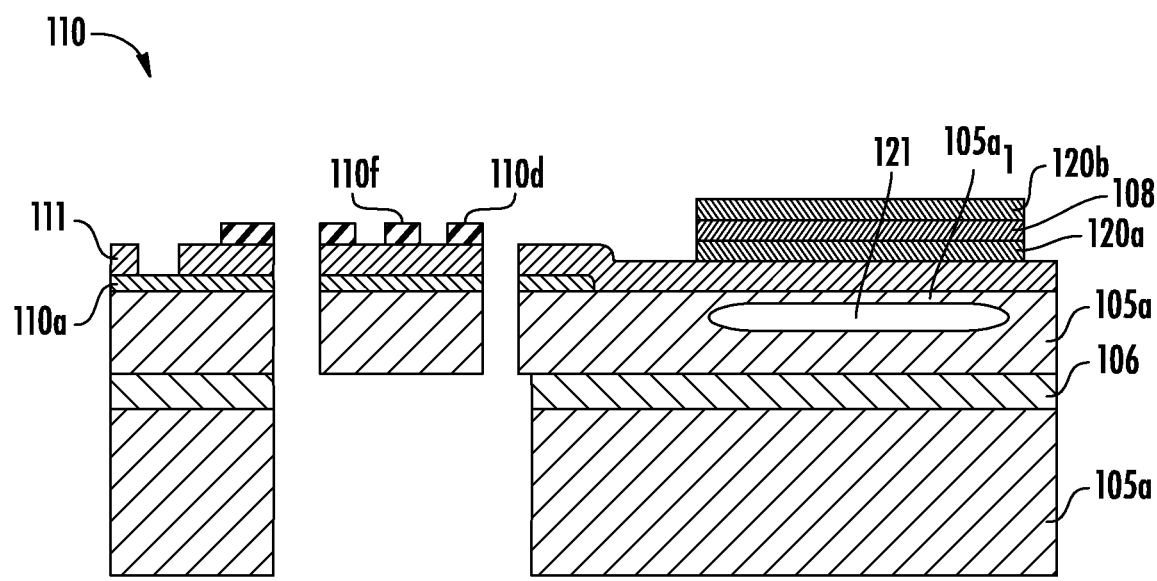

FIG. 5 shows a schematic view of an example wireless TPoS sensor setup. An impedance plot and equivalent BVD model of the piezoelectric resonator 110. The model of MEMS sensor shown as MEMS sensor 300 is same as that of the MEMS piezoelectric resonator 110 except that it has a variable capacitor added to one of its ports in the BVD model. This set up includes a signal source for generation of the pulsed excitation signal connected to an antenna, a signal measurement unit (e.g., oscillator) also directly connected to an antenna which is synchronized with the signal source and is capable of measuring and digitizing the signal reflected back from the wireless MEMS sensor 300 and the wireless sensor tag (including the antenna).

An example fabrication process for forming a disclosed wireless MEMS piezoelectric sensor including a MEMS piezoelectric resonator coupled to a variable capacitor connected together on the same substrate is now described. FIGS. 6A-6E show successive cross-sectional depictions of forming the resonator and variable capacitor having a simple mass-spring configuration. The process flow starts with the initial substrate 105 that can be a silicon wafer or an SOI wafer. The bottom metal layer shown as the bottom electrode layer 110*a* and then piezoelectric layer 111 are deposited or bonded to the substrate 105, with the result shown in FIG. 6A.

Next, the top metal layer 110*d*, 110*f* and the variable capacitor plates 120*a*, 120*b* having a sacrificial layer (e.g. silicon dioxide) sandwiched in between the plates 120*a*, 120*b* (in the case of a simple parallel plate capacitor with out-of-plane movement) are deposited and patterned and the piezoelectric layer 111 is then etched to form electrical contacts to the bottom electrode 110*a*. The same metal layer generally forms the bottom plate 120*a* for the variable capacitor 120 and the top electrodes 110*d*, 110*f* for the resonator 110. The stacks of the MEMS piezoelectric resonator 110 and the movable mass of the variable capacitor 120 are etched to define their lateral boundaries, with the result shown in FIG. 6D. Finally, the backside of the substrate 105 is etched to release the MEMS piezoelectric resonator 110 and the movable mass of the variable capacitor, such as using an oxide etchant. The sacrificial layer 108 sandwiched between the capacitor plates 120*a*, 120*b* can be removed in this step or in an additional step in case the sacrificial layer 108 is not silicon dioxide.

FIGS. 7A-E are successive cross-sectional depictions showing steps in an example fabrication process for forming a disclosed MEMS piezoelectric pressure sensor including a MEMS piezoelectric resonator 110 and a variable capacitor 120' including a movable bottom electrode. The variable capacitor 120' in this example is formed out of a fixed top plate 120*b* hanging above the substrate 105 that is connected to the bottom electrode 110*a* (ground) of the MEMS piezoelectric resonator 110 and a movable bottom electrode 120*a* that is formed by depositing metal on a thin diaphragm 105*a*₁ that is formed for example using "silicon on nothing" process on a void 121 that is in partial vacuum, where this plate is electrically connected to one of the top electrodes 110*d*, 110*f* of the MEMS piezoelectric resonator 110. The connection of the capacitor's top 120*b* plate and bottom plate 120*a* to the MEMS piezoelectric resonator's 110 top electrode (110*d* or 110*f*) and bottom electrode 110*a* can be reversed depending on the fabrication process, where the bending plate can be connected to either top or bottom electrode of the MEMS piezoelectric resonator 110 and vice versa for the fixed top electrode.

Due to the pressure gradient between the void 121 (in most cases partial vacuum) and the environment, the diaphragm 105a₁ is bent and as the pressure changes, the degree of such bending is changed, resulting in a change in the capacitance (change of the distance of the capacitor plates) of the variable capacitor 120' that is proportional to the resonant frequency of the MEMS piezoelectric resonator 110.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A thin-film sensor, comprising:
   a substrate;
   a thin-film piezoelectric resonator including a reference electrode on a first side of a piezoelectric layer, a first port for capacitor coupling comprising the reference electrode and a capacitor coupling electrode on a second side of the piezoelectric layer opposite the first side, and a second port for excitation signal coupling comprising the reference electrode and another electrode on a side opposite the first side, wherein the thin-film piezoelectric resonator has a natural resonant frequency;
   a variable capacitor on the substrate positioned lateral to the thin-film piezoelectric resonator having a first plate and a second plate that are connected to the first port; and
   an antenna or an oscillator circuit connected to the second port,
   wherein, responsive to a physical parameter, a capacitance of the variable capacitor changes thereby changing a frequency of the thin-film piezoelectric resonator relative to the natural resonant frequency to generate a frequency shift.

2. A method of sensing a physical parameter, comprising:
   providing a thin-film sensor comprising
      a substrate;
      a thin-film-piezoelectric resonator having a natural resonant frequency and, the thin-film piezoelectric resonator including a piezoelectric layer and a reference electrode;
      a first port for capacitor coupling comprising the reference electrode and a capacitor coupling electrode;
      a second port for excitation signal coupling comprising the reference electrode and another electrode;
      a variable capacitor on the substrate positioned lateral to the thin-film piezoelectric resonator having a first plate and a second plate that are connected to the first port, and
      an antenna or an oscillator circuit connected to the second port;
   the physical parameter changing a capacitance of the variable capacitor thereby changing a frequency of the thin-film piezoelectric resonator relative to the natural resonant frequency to provide a frequency shift;
   measuring the frequency shift; and
   determining a value of the physical parameter from the frequency shift.

3. The method of claim 2, further comprising forcing the thin-film piezoelectric resonator into oscillation by applying an excitation signal to the second port with a frequency that is within 5% of the natural resonant frequency.

4. The method of claim 3, further comprising:
   removing the excitation signal, wherein in response the thin-film piezoelectric resonator rings to provide a ringing signal during a ringing period at the natural resonant frequency ($\omega_0$) with an exponentially decaying amplitude ($e^{-t/\tau}$), where time constant $\tau$ is equal to $$\frac{2Q}{\omega_0}$$

where Q is the quality factor of the thin-film piezoelectric resonator, and during the ringing period, determining the natural resonant frequency by time gating the ringing signal and then taking a Fast Fourier Transform (FFT).

5. The method of claim 2, wherein the variable capacitor comprises a mass-spring structure including one of the first and second plates being a movable plate that transforms an applied acceleration into a change in the capacitance.

6. The method of claim 2, wherein the variable capacitor includes movable plate formed over a diaphragm over a void in a top substrate layer of the substrate, wherein the movable plate transforms an applied pressure as the physical parameter into a change in the capacitance.

7. The method of claim 2, wherein the thin-film piezoelectric resonator includes the antenna coupled to the second port, further comprising the antenna receiving the excitation signal as a wireless interrogation signal.

8. The method of claim 7, wherein the antenna is on the substrate.

9. The method of claim 2, wherein the thin-film piezoelectric resonator includes the oscillator circuit, further comprising the oscillator circuit exciting the thin-film piezoelectric resonator to a sustained oscillation, and monitoring an oscillation frequency of the oscillator circuit using electronic circuitry to determine the value of the physical parameter.

10. A thin-film piezoelectric sensor, comprising:
    a substrate;
    a thin-film piezoelectric resonator including a piezoelectric layer and a reference electrode, a first port for capacitor coupling comprising the reference electrode and a capacitor coupling electrode, and a second port for excitation signal coupling comprising the reference electrode and another electrode, wherein the thin-film piezoelectric resonator has a natural resonant frequency;
    a variable capacitor on the substrate positioned lateral to the thin-film piezoelectric resonator having a first plate and a second plate that are connected to the first port; and
    an antenna or an oscillator circuit connected to the second port,
    wherein, responsive to a physical parameter, a capacitance of the variable capacitor changes thereby changing a frequency of the thin-film piezoelectric resonator relative to the natural resonant frequency to generate a frequency shift.

11. The thin-film piezoelectric sensor of claim 10, wherein a first side of the piezoelectric layer comprises the reference electrode and is a bottom side of the thin-film piezoelectric sensor, and wherein a second side opposite the first side comprises the capacitor coupling electrode and is a top side of the thin-film piezoelectric sensor.

12. The thin-film piezoelectric sensor of claim 10, wherein the variable capacitor comprises a mass-spring structure including one of the first plate and the second plate being a movable plate that transforms an applied acceleration into a change in the capacitance.

13. The thin-film piezoelectric sensor of claim 10, wherein the thin-film piezoelectric sensor includes the antenna, wherein the second port is connected to the antenna, and wherein the antenna is configured for receiving a wireless stimulating signal and for wireless interrogation of the frequency shift.

14. The thin-film piezoelectric sensor of claim 13, wherein the antenna is on the substrate.

15. The thin-film piezoelectric sensor of claim 10, wherein the first plate comprises a movable plate formed over a diaphragm over a void in a top substrate layer of the substrate, wherein the movable plate transforms an applied pressure into a change in the capacitance.

16. The thin-film piezoelectric sensor of claim 10, wherein the substrate comprises a silicon on insulator (SOT) substrate including a top substrate layer, and wherein the thin-film piezoelectric resonator includes the piezoelectric layer stacked on the top substrate layer.

17. The thin-film piezoelectric sensor of claim 10, further comprising an oscillator circuit electrically coupled to the second port.

18. The thin-film piezoelectric sensor of claim 10, wherein the variable capacitor comprises a first variable capacitor and at least a second variable capacitor that each have a mass-spring structure connected in parallel to the first port, wherein the respective mass-spring structures each have different mass-spring properties or are oriented along different axes.

* * * * *